United States Patent [19]

Cooley et al.

[11] 4,320,486

[45] Mar. 16, 1982

[54] TRANSFERRING INFORMATION SIGNALS FROM A FIRST TO A SECOND RECORDING MEDIUM

[75] Inventors: Leslie F. Cooley, Farmingville; Rainer K. Zopfy, Ronkonkoma, both of N.Y.

[73] Assignee: Advanced Integrated Design, Incorporated, Bohemia, N.Y.

[21] Appl. No.: 111,190

[22] Filed: Jan. 11, 1980

[51] Int. Cl.[3] .............................................. G11B 13/04

[52] U.S. Cl. ........................................ 369/14; 360/15; 369/60; 369/61; 369/84; 369/91

[58] Field of Search .................. 179/100.1 R, 100.1 S, 179/100.1 G, 100.3 V, 100.4 R, 100.4 C, 100.4 ST, 100.4 D, 100.4 E, 100.1 TD, 100.1 A, 100.3 R; 360/13, 14, 15; 369/14, 60, 61, 62, 84, 91-92, 109, 111

[56] References Cited

U.S. PATENT DOCUMENTS

| | | | |
|---|---|---|---|
| 1,555,281 | 9/1925 | Engel et al. | 179/100.3 R |
| 1,910,254 | 5/1933 | Keller | 179/100.1 TD |
| 2,281,405 | 4/1942 | Barrish et al. | 179/100.1 S |
| 2,477,640 | 8/1949 | Montague | 179/100.4 C |
| 3,154,371 | 10/1964 | Johnson . | |
| 3,501,586 | 3/1970 | Russell . | |
| 3,624,284 | 11/1971 | Russell . | |
| 3,761,645 | 9/1973 | Stancel, Jr. . | |
| 3,781,479 | 12/1973 | Swoboda | 179/100.3 V |
| 3,795,902 | 3/1974 | Russell . | |
| 3,800,099 | 3/1974 | Dickopp et al. | 179/100.4 C |
| 3,806,643 | 4/1974 | Russell . | |
| 3,825,323 | 7/1974 | Landins . | |
| 3,891,794 | 6/1975 | Russell . | |
| 3,911,476 | 10/1975 | Keizer . | |
| 3,985,953 | 10/1976 | Dunkley . | |
| 4,051,527 | 9/1977 | Braat . | |

*Primary Examiner*—Raymond F. Cardillo, Jr.
*Attorney, Agent, or Firm*—Curtis, Morris & Safford

[57] ABSTRACT

A method and apparatus are disclosed for achieving improved efficiency and economy in the transfer of information signals from a first to a second recording medium utilizing an optical storage medium as an intermediate transfer medium. Information signals from a first recording medium are reproduced and recorded onto a second recording medium at speeds in the range of 2 to 200 times normal speed.

22 Claims, 4 Drawing Figures

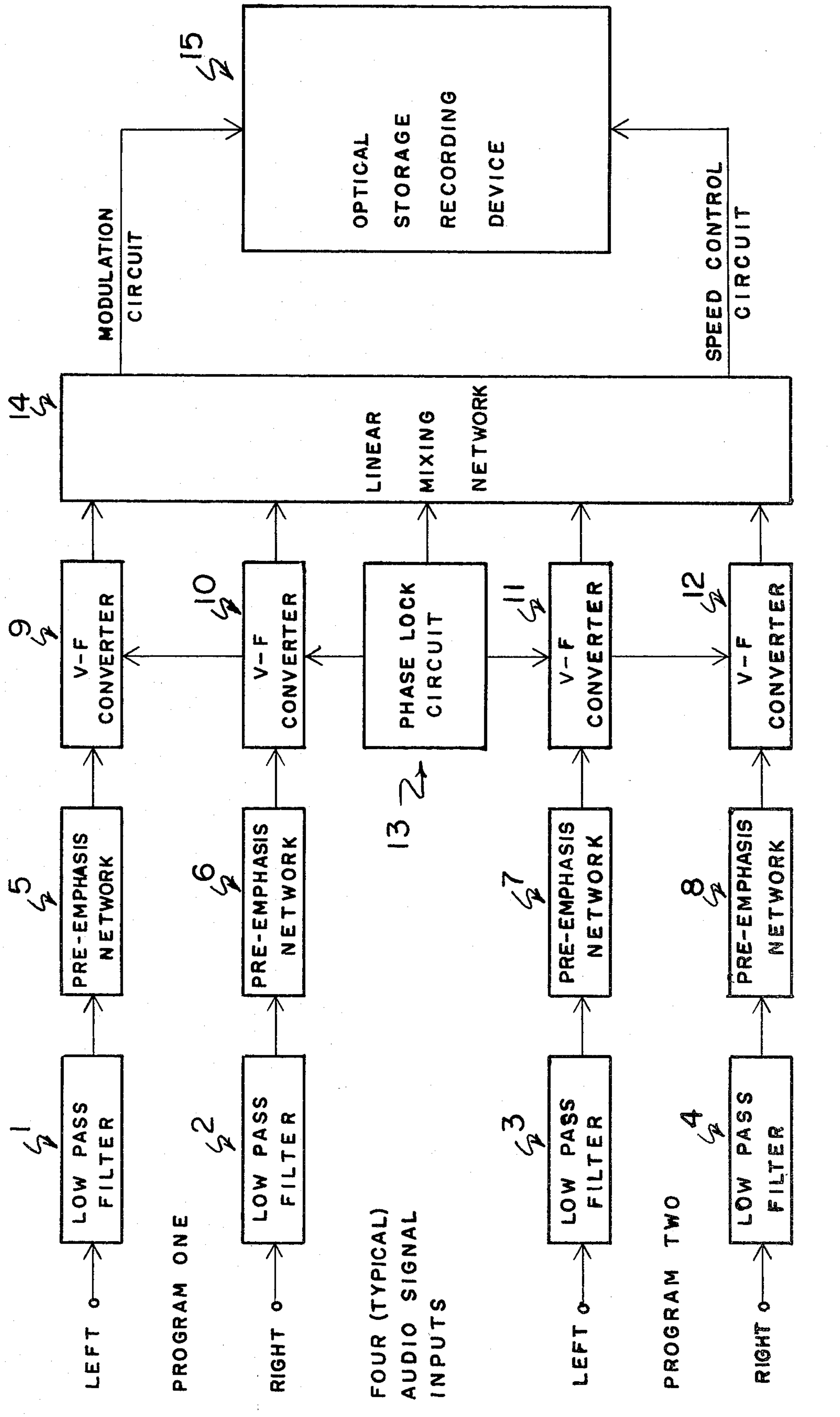
(Fig. 1)

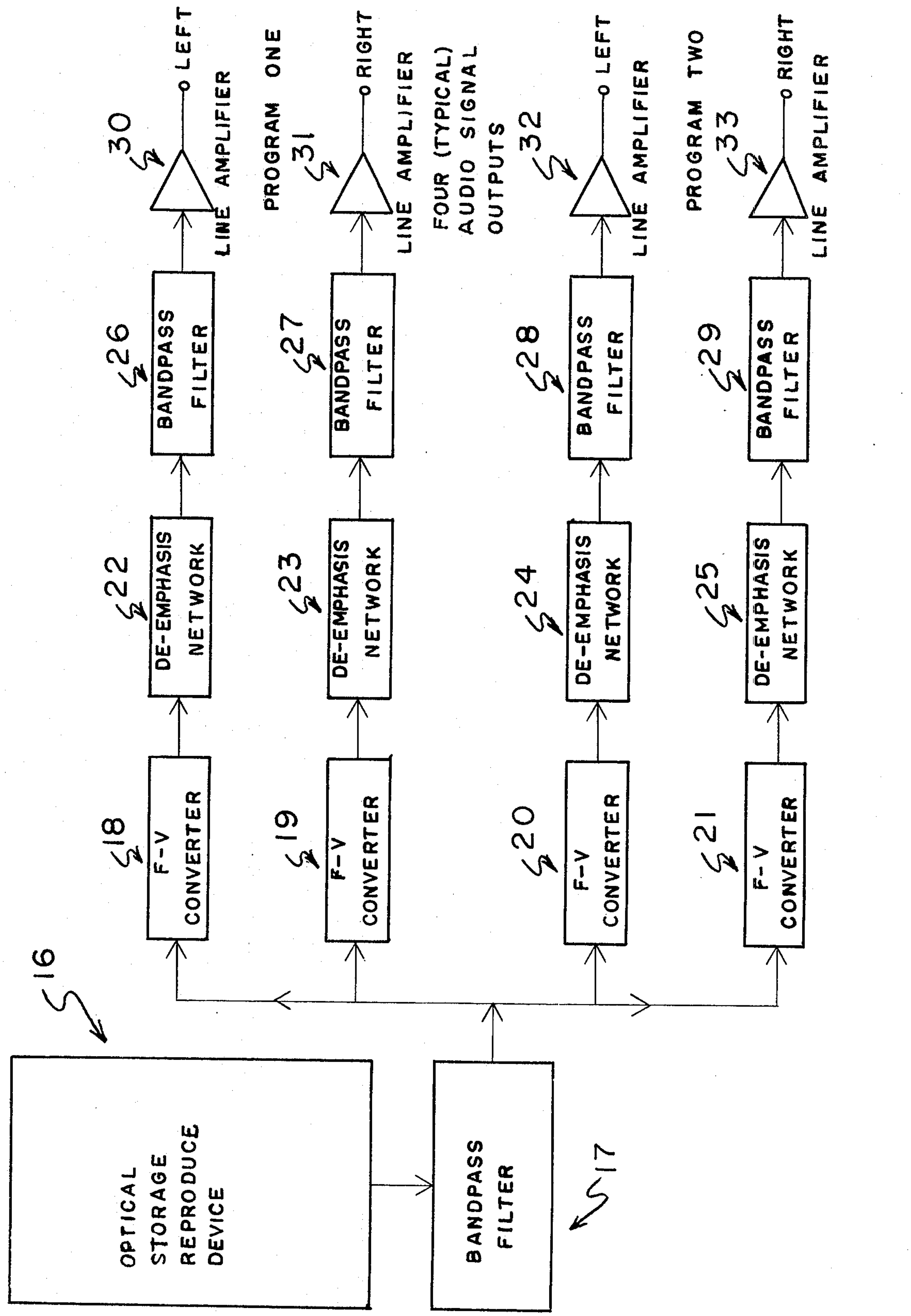
(Fig. 2)

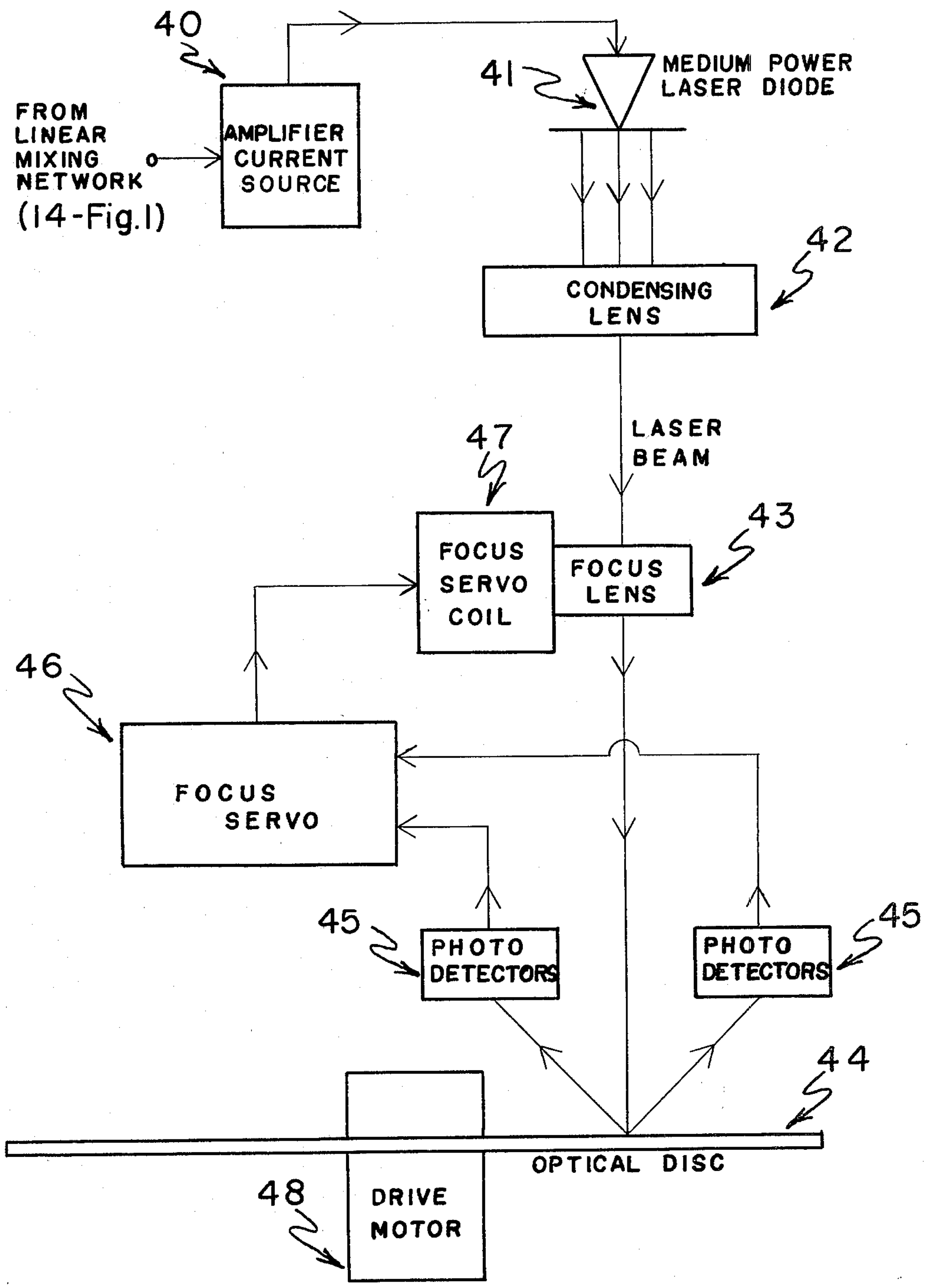
(Fig. 3)

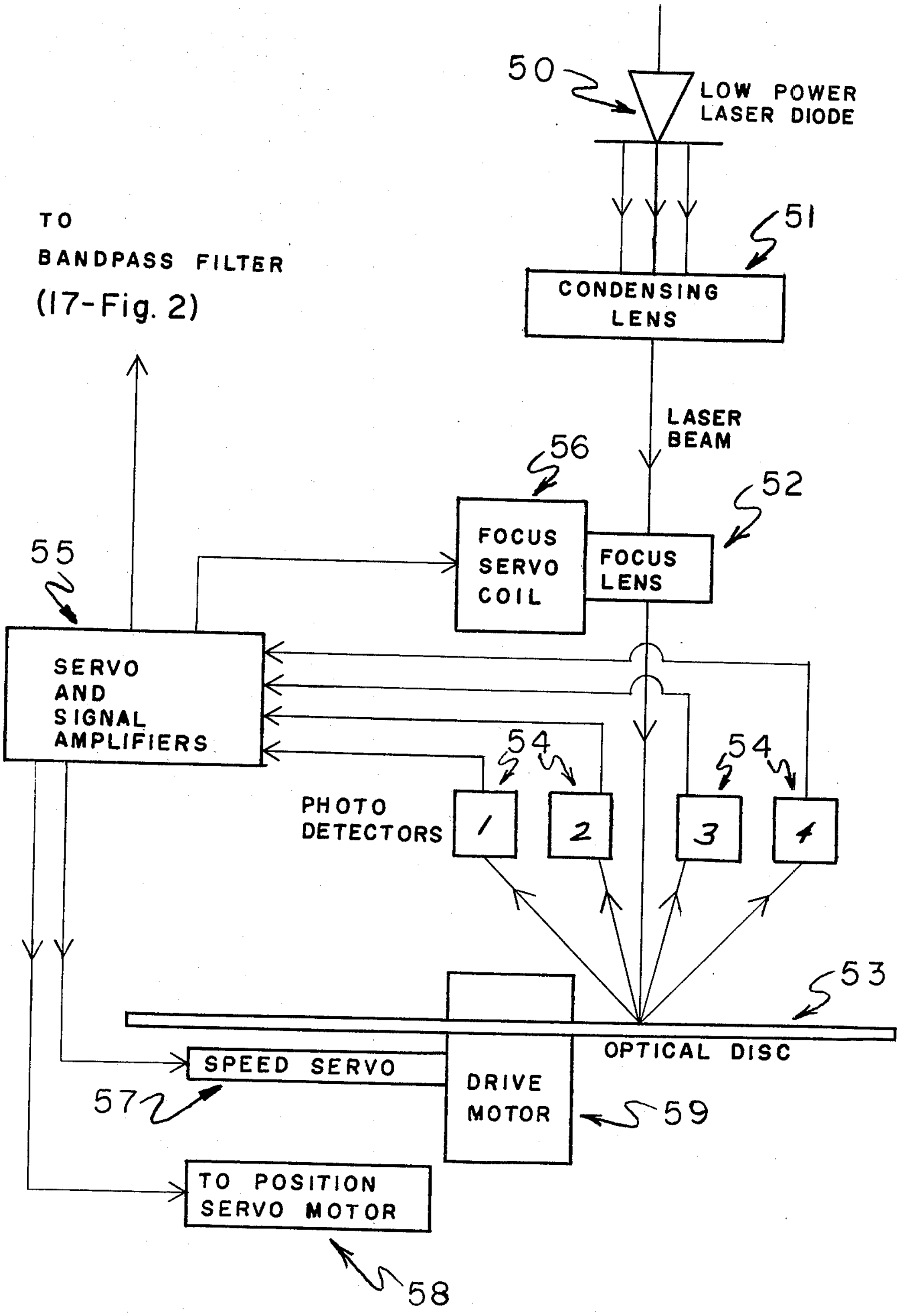
(Fig. 4)

TRANSFERRING INFORMATION SIGNALS FROM A FIRST TO A SECOND RECORDING MEDIUM

The present invention relates to transferring information signals between two recording media and, more particularly, to transferring information signals from a prerecorded medium, such as a master magnetic recording tape to slave magnetic recording tapes at speeds of 2 to 200 times normal speed, utilizing an optical storage medium.

BACKGROUND OF THE INVENTION

Conventional methods of transferring audio information, or programs, from a prerecorded "master magnetic" tape require the compilation of an "edited" master magnetic tape. Generally, the master magnetic tape is quarter-inch tape having audio signals recorded thereon in two-track stereo format. The audio signals are reproduced from this master magnetic tape and are edited onto the edited master in a desired sequence or arrangement such as, for example, four equal length programs for eight-track recordings or two equal length programs for four-track recording. The edited master magnetic tape then is reproduced by a tape reproduction machine, and suitable electronic devices, such as equalizers, limiters, noise reducers, and the like, process the reproduced signals to adjust the quality of the audio information.

The processed audio signals then are recorded onto a production master magnetic tape at normal reproducing speed.

Conventional production master tapes are either one-half or one-inch magnetic tapes; and are driven in a playback device known as a loop bin, wherein the processed audio signals recorded thereon are reproduced for recording onto yet another recording medium such as desired end-use magnetic tapes. The production master tape, having its respective ends spliced together in a continuous loop configuration is played back at high speed, such as on the order of between sixteen and sixty-four times normal reproducing speed. Hence, the information on the production master tape can be transferred onto blank magnetic tape by one or more high speed duplication recorders, known as "slaves", each of which ordinarily produces between twenty and sixty copies of the audio program on one continuous roll of blank tape.

In order to locate the beginning and end of each complete program a low frequency "cue" tone is recorded on the duplicated, or "slaved" recording medium as the splice on the production master tape passes a sensing device. However, the splice presents a physically weak structure which is susceptible of breakage after only a relatively few cycles of the production master tape. Also, the duplicating speeds at which the production master tape can be driven are limited by the relatively fragile nature thereof. Futhermore, while the production master tape is reproduced at high speed in the loop bin, a twist or wrinkle in the tape often develops, resulting in damage or destruction of the production master. As a result, numerous production master tapes must be compiled at considerable effort and expense in order to produce the desired number of end-use tapes. Additionally, use of an intermediate production master tape results in loss of fidelity from the original master tape. Detrimental effects in noise, distortion, degraded frequency response, poor phase response, drop outs, undesirable wow and flutter, and the like, also may result when a production master tape is compiled.

OBJECTS OF THE INVENTION

It is, therefore, an object of the present invention to provide an improved method and apparatus of transferring information signals from a first to a second recording medium which overcomes the disadvantages of conventional information transfer techniques.

It is another object of the present invention to utilize an optical recording medium in transferring information from a first recording medium onto a second recording medium.

It is a further object of this invention to provide a method and apparatus wherein information can be transferred at a wide range of speeds and particularly at high speeds heretofore not possible with conventional information transfer techniques.

It is still a further object of the present invention to provide a method of and apparatus for simultaneously transferring a number of tracks of information from an original master tape onto a second recording medium.

SUMMARY OF THE INVENTION

In accordance with the present invention, an intermediate tape is avoided. One feature of this invention is to use an optical recording medium as the intermediate transfer medium. Much, if not all, of the previously required equipment necessary for the use of a production master tape, is eliminated by the present invention, resulting in a significant cost and space savings. Additionally, when a different program is to be duplicated, it is far easier and more efficient to change the optical recording medium than to change a production master tape which must be threaded carefully through a loop bin and then spliced into endless loop configurations.

By the present invention, information signals on one record medium, such as on a prerecorded original master, are reproduced therefrom and converted into frequency modulated signals which control the intensity of a light beam, such as, for example, a laser beam, as a function of the reproduced information, resulting in a record track of high and low density areas of variable spacing on the optical recording medium. The record track on the optical recording medium is scanned by a second light beam at a speed in the range of 2 to 200 times the speed normally used to reproduce the information signals to modulate the second light beam. Light intensity modulations are converted into frequency modulated electrical signals which, in turn, are demodulated and then recorded at high speed on one or more second recording media, such as "slave" magnetic tapes.

BRIEF DESCRIPTION OF THE DRAWINGS

The following description of the present invention will best be understood in conjunction with accompanying drawings, in which:

FIG. 1 illustrates one embodiment of apparatus for recording information signals onto an optical storage medium;

FIG. 2 illustrates one embodiment of apparatus for reproducing information signals that had been recorded by the apparatus of FIG. 1;

FIG. 3 illustrates, in block diagram form, one embodiment of apparatus for controlling and focusing a light beam for recording information signals; and FIG. 4 illustrates one embodiment of apparatus for controlling and focusing a light beam for reproducing optically recorded information signals.

DETAILED DESCRIPTION OF CERTAIN PREFERRED EMBODIMENTS

FIG. 1 represents recording apparatus for recording information on an optical record medium, two pairs of stereo audio signals, shown as "program one" and "program two". Each program is formed of left-channel and right-channel audio signals. These audio signals are transmitted via respective audio processing circuits, each including a low pass filter, a pre-emphasis network and a frequency modulator in cascade. Low pass filters 1–4 are adapted to remove higher frequencies above that portion of the audio band that could interfere with the FM signals produced by the frequency modulators. The filtered signals are then applied to pre-emphasis networks 5–8 which are adapted to increase, or "boost", the amplitude of the audio signals in the higher frequency range of the audio frequency band to improve the signal-to-noise ratio. The respective filtered, pre-emphasized audio signals are supplied to frequency modulators or voltage-to-frequency converters 9–12 to modulate respective carrier frequencies of, for example, 100, 150, 200 and 200 KHz, proportional to the amplitudes of the supplied audio signals. A phase-lock circuit 13 is coupled to all of the voltage-to-frequency converters to assure that the respective carrier frequencies of the converters are maintained constant with respect to a reference frequency of the master oscillator (not shown) incorporated within the phase-lock circuit. The FM signals from voltage-to-frequency converters 9–12, and also the master reference signal from phase-lock circuit 13, are combined in a linear mixing network 14 to produce a modulated information signal and a reference speed control signal. These signals are applied from the linear mixing network to an optical storage recording device 15.

The low pass filters, pre-emphasis networks, voltage-to-frequency converters, phase-lock circuit and mixing circuit are all standard electronic circuits which are known to those of ordinary skill in the art. Optical storage recording device 15 may include a conventional, rotating photosensitive recording disc, such as the so-called video disc conventionally used for the recording and reproduction of video or television signals. In the optical storage recording device, the light beam moves at a velocity of about 30 inches per second relative to the surface of the recording material resulting in a rotational speed of about 50 RPM. It will be apparent that, if desired, the information signals supplied to the apparatus shown in FIG. 1 may comprise video signals, digital signals, or other information signals.

Turning to FIG. 2, apparatus for reproducing the audio signals recorded by optical storage recording device 15 is shown. This reproducing apparatus is capable of reproducing information signals from the optical recording medium, or disc, at speeds well-suited for high speed duplication of audio signals. Hence, the optical record disc may replace the one-inch production master tapes used in conventional tape duplicating systems.

The reproducing apparatus includes an optical storage reproducing device 16 adapted to receive a master optical record disc, such as produced by the apparatus shown in FIG. 1, and to reproduce the information signals recorded thereon. A light beam, such as a low power controlled laser beam, scans the optical record disc at a speed greater than the speed at which information was recorded thereon. Suitable optical storage reproducing devices are known and, as is conventional, an electrical signal is produced which is constituted by frequency modulated carriers. The frequency modulations correspond to the frequency modulated signals originally recorded on the optical record disc; but because of the higher reproducing speed, the reproduced carriers exhibit much higher frequencies. These reproduced frequency modulated signals pass through a band pass filter 17 to eliminate undesired noise and frequencies.

The filtered FM signals then are supplied to respective frequency-to-voltage converters 18–21 to convert the frequency-modulated carriers into corresponding amplitude varying signals. Converters 18–21 are seen to be FM demodulators. The demodulated signals are then passed through respective de-emphasis networks 22–25 which are in a complementary manner to pre-emphasis networks 8 (FIG. 1). The resulting amplitude varying signals are audio signals having flat, or uniform, amplitude versus frequency characteristics but are of a frequency that is shifted because of the high reproduction speeds. These signals are then passed through respective band pass filters 26–29 and amplifiers 30–33 to produce filtered, amplified, amplitude-varying signals for recording, at relatively high speeds, on blank recording tape by one or more high speed tape duplication recorders. Hence, it is seen that the audio information which had been recorded from a master magnetic tape onto the optical record disc is transferred at high speed to blank recording tape. Typically, to produce multiple copies of the audio programs, each of amplifiers 30–33 is coupled to multiple tape duplication recorders to drive same.

FIG. 3 shows a typical embodiment of apparatus to control the laser beam that may be used in optical storage recording device 15 to record the audio signals on the optical record disc. In the preferred optical recording storage device, a medium power laser diode 41 (i.e. on the order of 10 to 50 milliwatts) is used. Frequency-modulated signals from linear mixing network 14 are supplied via an amplifier to modulate the laser beam generated by laser diode 41. This laser beam passes through a condensing lens 42 and is focussed by a focussing lens 43 onto the surface of rotating optical recording disc 44, the latter being rotated by a highly stable drive motor 48. A portion of the recording beam is reflected from disc 44 to two photodetectors 45 which detect an error in the focus condition of the beam to produce focus error signals. These focus error signals are supplied to a focus servo circuit 46 which drives a focus servo coil 47. The focus servo coil adjusts the relative position of focussing lens 43 with respect to the surface of optical disc 44, thereby controlling the focus condition of the laser beam.

Preferably, optical disc 44 is rotated at a fixed position and the laser beam is controllably moved in a direction along the radius of the disc by suitable drive means (not shown) to scan a spiral track on the surface of the disc. As the intensity of the laser beam varies in response to the FM information signals supplied by linear mixing network 14, such information is recorded on the disc. In one embodiment this recorded information is in the form of closely spaced pits, approximately one micron in diameter. The spacing, or gap, between pits is a function of the frequency modulations of the information signal that drives, or intensity-modulates the laser beam. As the frequency increases, the spacing decreases and conversely, as the frequency decreases, the spacing increases. Hence, pit spacing represents the audio information which is reproduced from the original master recording tape.

FIG. 4 is an illustrative embodiment of apparatus to control the laser beam that may be used in optical storage reproduce device 16 to reproduce the audio information signals which are recorded on optical record disc 44 by the apparatus of FIGS. 1 and 3. It is recalled that these information signals are reproduced at speeds higher than at which they were recorded.

In the preferred optical storage reproduce device, a low power laser diode 50 (i.e. on the order of 1 to 5 milliwatts) is used to produce a laser beam. This laser beam passes through the condensing lens 51 and is focussed by a focussing lens 52 onto the surface of rotating optical record disc 44, the latter being rotatably driven by drive motor 59. A portion of this reproducing laser beam is reflected from disc 44 to an array of photodetectors 54 which supply servo and audio information signals to servo and signal amplifiers 55. The servo information signals are used to control the focus of the laser beam, as by a focus servo coil 56, and also to control the position of the laser beam, as by a position servo motor 58. The servo information signals also are used by a speed servo circuit 57 to control the rotary speed of disc drive motor 59.

Photodetectors 54-1 and 54-4 may be similar to photodetectors 45 (FIG. 3) to sense an unfocussed condition of the laser beam spot and to produce focus error signals that are used by servo amplifiers 55 to control focus servo coil 56 to adjust focussing lens 52. Photodetectors 54-2 and 54-3 may be adapted to sense when the laser beam spot drifts from its desired center position on the spiral record track and to produce position error signals that are used by servo amplifiers 55 to control position servo motor 58 to adjust the position of the beam. Also, as the laser beam scans the pits recorded on disc 44, the intensity of the reflected beam varies as a function of these pits. Photodetectors 54 respond to such intensity variations to produce corresponding electrical signals that are frequency modulated signals. These FM signals are amplified by signal amplifiers 55 and supplied to band pass filters 17 (FIG. 2). It is appreciated that these frequency modulations represent the original audio information.

Thus, it is seen that the present invention provides an efficient, low-cost, technique for transferring at high speeds, information from an original recording medium, such as a master magnetic tape, to one or more (slave) recording media, such as slave blank recording tape, using an intermediate optical recording medium, such as optical disc 44. Although the information preferably is recorded on optical disc 44 in the form of variably spaced pits, this information may take the form of a continuously varying, or analog, record groove. Furthermore, the information that is transferred by the present invention need not be limited solely to audio information. It is appreciated that signals representing digital information video information or other data may be transferred. Also, optical disc 44 may be replaced by an optical recording drum. In addition, a number of separate channels of information signals, or programs, may be mixed, as by frequency division multiplexing (shown in FIG. 1) or by other multiplexing techniques for recording on optical disc 44; or, alternatively, only a single channel of information signals may be recorded. As is appreciated, the laser control apparatus shown in FIGS. 3 and 4 is conventional and, in the interest of brevity, is not further described.

The optical recording material used in this invention may be a conventional photographic film or plate requiring chemical processing after exposure, such as "Panatomic-X" manufactured by Eastman Kodak. Alternatively, the recording material may be a thin metallic coating (about 10 microinches) deposited on a transparent substrate, such as glass or plastic. The metallic coating may consist of tellurium or tellurium alloy material which can be vaporized by the laser beam used with this invention. Such a material is available from Philips Corporation under the trademark "AIRSANDWICH." Another material suitable for use as a recording medium is a plastic material containing cubic silver particles which can be altered to a non-reflecting state with the laser beam used with this invention. Such a material is manufactured by Drexler Corporation under the trademark "DREXON".

While the present invention has been particularly shown and described with reference to preferred embodiments thereof, it should be appreciated that various changes and modifications in form and details may be made without departing from the spirit and scope of the invention. Some of these changes and modifications have been mentioned above. It is intended that the appended claims be interpreted to cover such changes and modifications.

We claim:

1. A method of high-speed preparation of audio cassette tapes from a master recording on which audio information is contained, comprising the steps of reproducing the master recording at a master playback speed; angularly modulating a carrier with the reproduced audio information; providing relative rotation at a first speed between an optical recording medium and a first light beam incident thereon while modulating the intensity of said first light beam as a function of the angularly-modulated carrier, thereby producing an intermediate recording of said audio information on said optical recording medium; optically scanning said optical recording medium having said intermediate recording thereon at a second, substantially higher speed with a second light beam to reproduce the intermediate recording at said second, higher speed; angularly demodulating the optically reproduced intermediate recording to provide a demodulated signal; and advancing at least one said cassette tape at a high speed corresponding to said second speed while magnetically recording the demodulated signal thereon, so that when said cassette tape is played back at its normal speed said audio information will be reproduced.

2. The method of claim 1 wherein said first light beam is a laser beam.

3. The method of claim 1 wherein the second light beam is a laser beam.

4. The method of claim 1 wherein said optical recording means comprises a disc of photosensitive material.

5. The method of claim 1 further comprising before said step of angularly modulating, pre-emphasizing said reproduced audio information; and, after said step of angularly demodulating, de-emphasizing the demodulated signal.

6. The method of claim 1 wherein said second higher speed is from 2 to 200 times said first speed.

7. The method of claim 1 wherein said second higher speed is from 64 to 200 times said first speed.

8. The method of claim 1 wherein the information signals recorded on said first recording medium are audio signals.

9. A method of transferring at least a first and a second audio program simultaneously from a master recording to at least one cassette tape, wherein each of said first and second programs includes a left and a right channel signal, the second program being recorded reversely to said first program so that when said master recording is played, the second program channel signals are reproduced from back to front while the first program channel signals are reproduced from front to back; comprising the steps of reproducing said master recording at a first speed; introducing each said channel signal into a respective channel circuit; providing four carriers, each at a respective different frequency; angularly modulating each of the four carriers with a respective one of said channel signals in modulators in the respective channel circuits; linearly mixing the four modulated carriers to provide a mixed signal; modulating a light beam with said mixed signal; scanning an optical recording medium with said modulated first light beam to record said mixed signal on said optical recording medium at a low speed corresponding to said first speed, thereby creating an intermediate recording; scanning said optical medium having said intermediate recording thereon at a substantially higher speed with a second light beam to substantially reproduce said intermediate signal; angularly demodulating said intermediate signal to provide four output signals corresponding respectively to said channel signals; and advancing said tape cassette at a second speed higher than said first speed while recording said four output signals simultaneously thereon, so that when the resulting cassette tape is thereafter played back at normal speed in a first direction, the left and right channel signals of said first program will be reproduced and when played back at normal speed in a second, opposite direction, the left and right channels signals of said second program will be reproduced.

10. The method of claim 9 wherein said step of providing the four carriers includes providing said respective different frequencies thereof so that the frequencies other than the lowest are integral multiples of the lowest frequency.

11. The method of either claim 9 or 10 wherein said step of providing the four carriers includes providing a reference frequency, and locking the carrier frequencies to the reference frequency.

12. The method of claim 1, 9, or 10 wherein said angularly modulating includes frequency modulating.

13. A method of transferring audio signals from a first recording medium to a second recording medium comprising the steps of reproducing said audio signals from said first recording medium; modulating a carrier with said reproduced audio signals thereby to produce corresponding first frequency modulated signals, controlling the intensity of a first light beam with said first frequency modulated signals, scanning at a first speed an intermediate optical recording means with said intensity-controlled first light beam by controllably moving said first light beam across a surface of said optical recording means to produce a record track having high and low density areas, scanning said optical recording means with a second light beam at a second, higher speed to vary the intensity of said second light beam in accordance with said high and low density areas; deriving second frequency modulated signals from the intensity variations of said second light beam; converting said second frequency modulated signals into amplitude-varying signals; and advancing said second recording medium at an above-normal speed while recording said amplitude-varying signals on said second recording medium at said second higher speed.

14. Apparatus for transferring audio signals from a first recording medium to a second recording medium comprising said first recording medium; means for reproducing said audio signals from said first recording medium; frequency modulator means for modulating a carrier with said audio signals to produce corresponding first frequency modulated signals; means for controlling the intensity of a first light beam in response to said first frequency modulated signals; optical recording means; means for scanning at a first speed said optical recording means with said intensity-controlled first light beam to produce a record track on said optical recording means having high and low density areas; means for scanning said optical recording means with a second light beam at a second higher speed to vary the intensity of said second light beam in accordance with said high and low density areas scanned thereby; means for deriving second frequency modulated signals from the intensity variations of said second light beam; frequency demodulator means for converting said second frequency modulated signals into amplitude-varying signals; and means for recording said amplitude-varying signals on said second recording medium at said second higher speed.

15. The apparatus of claim 14 wherein said first light beam is a laser beam.

16. The apparatus of claim 15 wherein the second light beam is a laser beam.

17. The apparatus of claim 16 wherein said optical recording means comprises a disc of photosensitive material.

18. The apparatus of claim 17 wherein said audio signals on said first recording medium include a plurality of signal channels ultimately to be recorded simultaneously on said second record medium; said frequency modulator means includes a corresponding plurality of frequency modulators each provided with a respective carrier at a respective different frequency; said second frequency modulated signals are provided as a corresponding plurality of frequency-modulated higher-frequency carriers; and said frequency demodulator means includes a corresponding plurality of frequency-to-voltage converters, each sensitive to a respective one of said frequency-modulated higher-frequency carriers.

19. The apparatus of claim 18 wherein said frequency modulator means further includes frequency generator means for supplying a reference frequency to said plurality of frequency modulators; and means for locking the frequencies of said respective carriers to said reference frequency.

20. The apparatus of claim 19 wherein said means for supplying a reference frequency includes a phase-locked loop circuit.

21. The apparatus of claim 19 further comprising servo control signal generator means having respective inputs coupled to said frequency modulators and to said frequency generator means and an output providing a speed control signal; and said means for scanning said optical recording means at said first speed is responsive to said speed control signal to regulate its scanning speed.

22. The apparatus of claim 18 further comprising a linear mixing network having inputs coupled to said frequency modulators and an output coupled to said means for controlling the intensity of the first light beam.

* * * * *